United States Patent [19]

Satomura

[11] 3,927,133
[45] Dec. 16, 1975

[54] PROCESS FOR SYNTHESIZING STYRENE TYPE COMPOUNDS

[75] Inventor: Masato Satomura, Asaka, Japan

[73] Assignee: Fuji Photo Film Co., Ltd., Ashigara, Japan

[22] Filed: Dec. 26, 1973

[21] Appl. No.: 427,867

[30] Foreign Application Priority Data

Dec. 26, 1972 Japan................................. 48-2839

[52] U.S. Cl....... 260/669 QZ; 260/576; 260/612 D; 260/645; 260/650 R; 260/650 F; 260/651 R; 260/651 F
[51] Int. Cl.$^2$...................... C07C 15/10; C07C 1/20
[58] Field of Search............................. 260/669 QZ

[56] References Cited
UNITED STATES PATENTS 2,780,649  2/1957  Williams...................... 260/669 QZ
3,057,932  10/1962  Hiser............................ 260/669 QZ

OTHER PUBLICATIONS

Salzbecher et al., J. Org. Chem., 13, 303–308, (1948).

*Primary Examiner*—C. Davis
*Attorney, Agent, or Firm*—Sughrue, Rothwell, Mion, Zinn & Macpeak

[57] ABSTRACT

A process for preparing a styrene type compound comprising mixing at least one compound selected from the group consisting of acetophenone, an acetophenone derivative, and a propiophenone derivative, having one or more substituents on the aromatic nucleus with an aluminum compound, heating the mixture to about 150°C or more to form the aluminium compound, and thereafter heating further to prepare the styrene type compound.

30 Claims, No Drawings

PROCESS FOR SYNTHESIZING STYRENE TYPE COMPOUNDS

BACKGROUND OF THE INVENTION

1. Field of the Invention

The present invention relates to a process for synthesizing styrene type compounds. The styrene type compounds as referred to herein in the present specification include styrene and styrene derivatives having one or more substituents on the aromatic ring.

2. Description of the Prior Art.

Styrene type compounds are useful for preparing polymers and, in particular, are easily polymerizable vinyl monomers. Methods for synthesizing styrene type compounds have heretofore been reported in detail, for example, by W. S. Emerson in *Chemical Review* pp. 347–383 (1948). However, no development has thereafter been attained in this kind of synthetic method, and in particular, no particularly novel method of synthesizing styrene type derivatives having one or more substituents has been found up to now.

Anyway, of those known methods, from various standpoints it is believed that the method comprising the dehydration of alphaphenylethylalcohol is the most excellent method presently known for synthesizing styrene type compounds, as so described in Emerson supra. However, in the synthesis of alcohols, for example, in the Meerwein-Pondorf reduction method starting from a ketone or in the Grignard method starting from an aldehyde, the resulting alcohols must necessarily be isolated through hydrolysis after the synthesis, and moreover, the dehydration of the thus prepared alcohols to follow requires a serious continuous reaction which is carried out at a high temperature and under a reduced pressure, and thus the yield of the resulting styrene type compounds, as the final products in the dehydration of alcohols, is in general fairly low, or at most 60 percent or so, (as disclosed in U.S. Pat. No. 3,526,674 *Organic Synthesis Coll.* Vol 3 204, Japanese Patent Applications laid open to public inspection 34,833/1973 and 23,734/1973). Thus, the method utilizing the dehydration of alcohols includes various disadvantageous problems.

SUMMARY OF THE INVENTION

An object of the present invention is to overcome the above described drawbacks in prior art techniques and to improve both the conditions of operation of the reaction and the yield in the synthesis of styrene type compounds, and in particular, to provide a new process for synthesizing styrene type compounds where at least one compound selected from the group consisting of acetophenone an acetophenone derivative, and a propiophenone derivative having one or more substituents on the aromatic nucleus is reacted with an aluminum compound.

DETAILED DESCRIPTION OF THE INVENTION

The acetophenone derivatives and propiophenone derivatives which can be used in the present invention include those containing one or more substituents, such as halogen atoms, alkyl groups and/or alkoxy groups on the acetophenone aromatic nucleus.

These compounds can be represented by the general formula

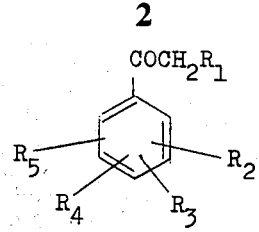

wherein $R_1$ is a hydrogen atom or a methyl group; $R_2$, $R_3$, $R_4$ and $R_5$ each is a halogen atom, an alkyl group, an allyl group, an alkoxy group, an allyloxy group, an aryloxy group, a halogen substituted alkyl group, a halogen substituted alkoxy group, a nitro group, and a dimethylamino group.

Suitable examples of halogen atoms are Cl, Br, F and suitable examples of alkyl, alkoxy, substituted alkyl and substituted alkoxy groups are methyl, ethyl, propyl, isopropyl, t-butyl, t-octyl, benzyl, methoxy, ethoxy, chloromethyl, t-butoxy, methoxymethyl, methoxyethyl, benzyloxy, thiomethoxy etc. groups. Halogen atoms and alkoxy groups are preferred substituents. The number of carbon atoms in these alkyl and alkoxy moieties ranges from 1 to about 10, preferably 1 to 8, and the number of substituents generally ranges from 1 to 4, preferably 1 to 2. Suitable examples of these derivatives are, for example, chloroacetophenone, dichloroacetophenone, bromoacetophenone, methylacetophenone, methoxyacetophenone, benzyloxyacetophenone, dimethoxyacetophenone, chloromethylacetophenone, fluoroacetophenone, difluoroacetophenone, tetramethylacetophenone, trimethylacetophenone, trifluoromethylacetophenone, nitroacetophenone, dimethylaminoacetophenone, allylacetophenone, isopropylacetophenone, allylpropiophenone, methoxypropiophenone, allyoxyacetophenone, etc. However, the substituents on the aromatic nucleus of the acetophenone derivative and the propiophenone derivatives are not directly involved in the reaction in the synthesis process of the present invention, and so these substituents can be basically any substituents in addition to the above specifically described groups, or that is, the substituents are in no way limited whatsoever to only the above described substituents. Hereinafter, for brevity, in the description to follow the term "acetophenone" will be used to cover both acetophenone and its derivatives and propiophenone derivatives.

The aluminum compounds which can be used in the present invention are preferably the alcohol derivatives thereof, and in particular, aluminum alkoxides are especially effective. Representative examples of suitable aluminum alkoxides which can be used are those having at least one Al - O - R bond where R is methyl, ethyl, propyl, isopropyl, sec-butyl, n-butyl, t-butyl, 2-pentyl, 2-octyl, 2-nonyl, methoxymethyl, phenyl, allyl, 2-keto-3-pentenyl-4-, 4-ethoxy-4-oxo-3-buten-2-, 1-keto-2-propenyl-1,3-diphenyl-3-, etc. derived from one or more primary, secondary, or tertiary alcohols, phenolic alcohol and ketone enol including methanol, ethanol, isopropanol, n-butanol, 2-butanol, t-butanol, 2-pentanol, 2-octanol, acetylacetone, benzoylacetone, 2-nonanol, methoxyethanol, propyleneglycol and phenol, and in particular, preferably those derived from one or more secondary alcohols. In addition to these compounds, a number of compounds which can form aluminum alkoxides through chemical reaction or thermal reaction thereof can also be used, if desired, in the present invention, and these include aluminum halides, alkyl aluminum compounds, and aluminum hydrides by reaction with an alcohol, aluminum using, as catalysts silver chloride, water, oxygen, alcohols, iodine, carbon tetrachloride, etc. and reaction with an alcohol, aluminum alkyl halides, by a similar reaction, aluminum soap, etc., as disclosed in Ziegler et al *Ann d. Chem*, 629, 241 (1960). In addition, these can also be used together with aluminum alkoxides. Of these compounds, an aluminum alkoxide in which the alkoxide group has from 1 to 9 carbon atoms, preferably 2 to 5 carbon atoms is preferred. In particular, a secondary alkoxide group is preferred.

In addition, the halides, oxides, alkoxides, salts of fatty acids, etc. of other metals (such as iron, cobalt, nickel, titanium thallium, magnesium, tin, lead, sodium, potassium, palladium, platinum, etc), for example, tetraisopropyl titanate, tetra-sec.-butyl titanate, sodium isopropoxide, sodium acetate, magnesium ethoxide, magnesium chloride or thallium nitrate can also be used, if desired, together with the aluminum alkoxides.

The amount of the aluminum compound which can be used is not specifically limited, and is preferably 1/100 molar equivalent or more, for example, in the range of 1/40 to 10 molar equivalents, on the basis of the acetophenone used.

The synthesis process of the present invention is extremely simple, that is, at least one acetophenone, an acetophenone derivative, and a propiophenone derivative is mixed with the aluminum compound, heated to above 150°C or more to form the latter and then again heated further to form a styrene type compound. In general, the product obtained is isolated by distillation. It is preferable to add to the reaction system a small amount of a polymerization inhibitor in a substantially effective amount, for example, from $10^{-4}$ to 15 mole percent, to the carbonyl compound, preferably 0.01 to 5 percent, such as hydroquinone, sulfur, phenylnaphthylamine or p-benzoquinone, and an organic solvent which is inert to the reaction can also be added, if desired. For example, it was noticed that the presence of a secondary alcohol in the reaction system caused can increase in the yield of the product, as will be apparent from Example 2 to follow. In addition, a solvent of high boiling point, e.g., above 150°C, preferably above 200°C can also be used together. Suitable examples of such solvents include diphenyl ether, terphenyl, mono or poly alkylated naphthalene (such as isopropyl, t-butyl, t-amyl, sec-amyl, t-octyl and the like), naphthyl ether (such as phenyl, butyl, amyl, octyl and the like), and alcohols (2-nonanol and the like).

While not desiring to be bound by theory, the process of this invention to form an olefin (a styrene derivative) from a ketone (acetophenone, an acetophenone derivative or a propiophenone derivative) could proceed as follows, where an aluminum alkoxide of a secondary alcohol is used as the aluminum compound

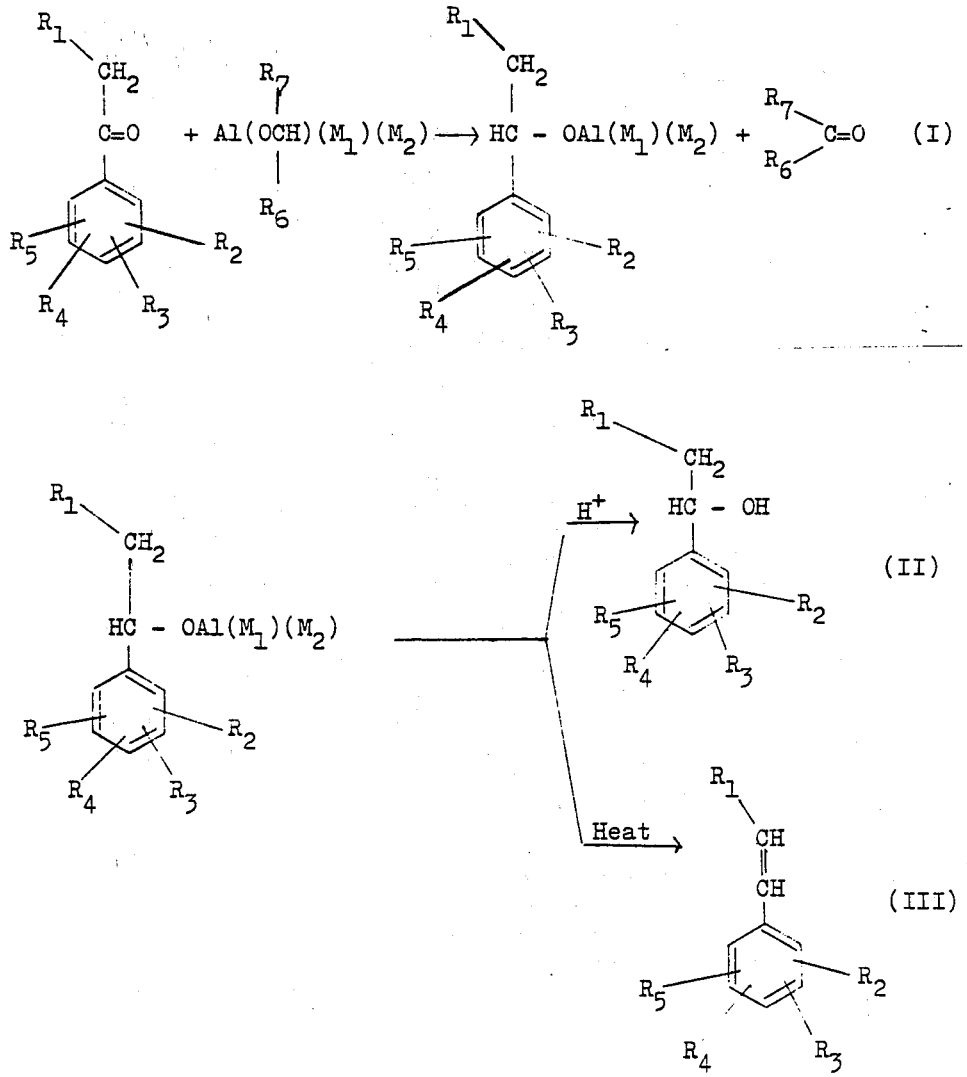

wherein $R_1$ to $R_5$ are as hereinbefore defined, $R_6$ and $R_7$ are the residue from the secondary alcohol used and $M_1$ and $M_2$ are other groups to satisfy the valency of the aluminum.

Reaction schematic (I) shows an intermediate formation through an interchange reaction. This reaction schematic (I) is in accordance with other schematics described in the literature as for example in A.L. Wilds, *Organic Reactions*, Vol. 2, 178 (1944).

Reaction schematic (II) shows the usual Meerwein-Pondorf reduction to obtain an alcohol from a ketone.

Reaction schematic (III) shows an important feature of this invention in that the intermediate obtained in reaction schematic (I) undergoes a thermal scission at the carbon-oxygen bond to form the olefin (styrene derivative). In this invention, thus, any such aluminum compound which can form a reaction intermediate as shown in reaction schematic (I) is useful in this invention.

Suitable reaction temperatures which can be employed are temperatures above 150°C, preferably 170° to 500°C. Use of temperatures lower than 140°C is not advantageous because the reaction does not proceed well. The reaction time depends largely on the temperature employed and will vary but generally requires at most 3 hours. Suitable pressures which can be employed range from 0.01mmHg to 10 atm/cm², preferably 1 to 50mmHg.

The present invention provides a novel method for synthesizing easily polymerizable vinyl compounds, and the advantages thereof are that the synthesis is quite simple in comparison with the conventional alcohol dehydration method and the products can be obtained in a high selectivity and a high yield. Thus, the present invention is extremely advantageous and valuable in the field of high polymer fine chemicals. The styrene derivatives of the present invention can be used as intermediates in the preparation of plastics and functional polymers. For example vinyl phenol can, in a usual manner, be converted to an ester using an acid chloride, ketone, or chloro formate, to a urethane using an isocyanate or thioisocyanate, etc.

Now, the present invention will be explained in greater detail by reference to the following Examples. Unless otherwise indicated all parts, percents, radios and the like are by weight.

EXAMPLE 1

0.50 mol of p-methoxyacetophenone and 0.37 mol of aluminum isopropoxide were weighed and put in an elliptically shaped flask (capacity: 500 ml), and a small amount (about 0.1g or so) of hydroqouinone (as a polymerization inhibitor) and 100 ml of isopropanol were then added thereto. Thereafter, the mixture was heated to about 140° to 200°C for 5 to 10 minutes to dissolve the aluminum isopropoxide. Afterwards, the heating was continuously carried out under normal pressure (about atmospheric), and after a fraction having a low boiling point of 83°C was distilled off, another fraction having a boiling point of about 120°C or more was forcibly distilled off by heating up to about 350°C under a reduced pressure of about 60–100 mmHg and the distilled fraction was then isolated. The distillate fraction was dried and the remaining solid weighed 75g.

After analysis of the distillate fraction obtained using gas chromatography (column: SE 52 a phenylmethyl silicone produced by Hitachi, Ltd., column temperature: 130°C), it was noticed from the area ratio that the fraction consisted of 42g of p-methoxystyrene and a small amount (1% or less) of p-methoxyacetophenone (the starting raw material). Accordingly, the yield of the p-methoxystyrene product was about 63%.

On the other hand, p-methoxyphenylmethylcarbinol was subjected to dehydration using potassium acid sulfate (as described in *O.S. Coll.* Vol 3, 204) for the purposes of comparison. The substance obtained was subjected to analysis using gas chromatography, where the retention time corresponded to that obtained in Example 1 above. Thus, it was noted that the substance obtained was p-methoxystyrene. The yield of p-methoxystyrene based on the alcohol used was about 50 percent.

EXAMPLE 2

0.50 mol of p-chloroacetophenone and 0.38 mol of aluminum isopropoxide were dissolved under heating to reflux at 80°C in 100 ml of isopropanol. In this case too, a small amount of a polymerization inhibitor (2 g of hydroquinone monobenzyl ether) was added as the case of the Example 1. After the same heating reaction treatment as described the Example 1 was conducted, a distillate was isolated under a reduced pressure of about 40 mmHg. After the same analysis as described in Example 1, the area ratio of p-chlorostyrene to p-chloroacetophenone was 99 or more. After drying, the product was isolated by rectification whereby a small amount of a polymer was obtained as a residue. The yield of the p-chlorostyrene final product was 77 percent or more.

The product was identified from the fact that the gas chromatographic retention time of the present final product corresponded to the product obtained from the dehydration of p-chlorophenylmethylcarbinol. In addition, the results of infrared absorption spectral analysis and nuclear magnetic resonance spectral analysis of the two products obtained as described above also corresponded.

When p-bromoacetophenone was used as the raw material, the yield of the p-bromostyrene resulting product was about 80 percent.

On the other hand, the yields of the products according to the carbinol dehydration method as described above were about 50–55 percent each.

EXAMPLE 3

In the above Examples 1 and 2, the use of secondary alcohols was exemplified. The present Example exemplifies a case of the use of no solvent.

25 g of p-methoxyacetophenone, 25g of aluminum isopropoxide and 0.2g of hydroquinone were weighed and put in an elliptically shaped flask of 100 ml capacity, and then the mixture was heated and dissolved. Afterwards, a fractionating head and a Liebig condenser column were connected to the flask, and the reaction system was continuously heated at 150°C while the system was kept under a reduced pressure of 40–15 mmHg. The distilled solution was cooled with ice-water to 0° to 50°C and isolated to obtain about 33g of distillate. The resulting distillate was analyzed under the same conditions as described in Example 1, and it was found that about 16g of p-methoxystyrene (yield: about 72% of theoretical value) were formed. It is an interesting fact that other low boiling point fractions were also confirmed, and it was found after analysis using gas chromatography (column: Porapak Q, a polystyrene, column temperature: 140°C) that these fractions consisted of acetone and isopropanol in a weight ratio of about 1 : 2.

EXAMPLE 4

25g of p-methoxyacetophenone and 34g of aluminum isopropoxide (molar ratio, about 1 : 1) and 0.1g of hydroquinone and 100 ml of isopropanol were put in an elliptically shaped flask (capacity: 200 ml) and heated at 100°C and refluxed slowly for 1 hour to dissolve the aluminum isopropoxide. Next, the pressure in the interior of the container was reduced to 5 to 10 mmHg and the temperature therein was elevated to 250°C to separate a distillate, which was then rectified. 17.2g (yield: 78%) of p-methoxystyrene were obtained as a fraction having a boiling point of 90°–92°C (14 mmHg). When aluminum sec-butoxide was used, almost the same result was obtained.

While the invention has been described in detail and with reference to specific embodiments thereof, it will be apparent to one skilled in the art that various changes and modifications can be made therein without departing from the spirit and scope thereof.

What is claimed is:

1. A process for synthesizing styrene comprising reacting at least one compound selected from the group consisting of acetophenone, an acetophenone derivative, and a propiophenone derivative having one or more substituents in the aromatic nucleus with an aluminum compound having at least one aluminum-oxygen atoms, alkyl groups, aralkyl groups, aryloxy tive and said propiophenone derivative has one or more substituents selected from the group consisting of halogen atoms, alkyl groups, aralkyl groups, aryloxy groups, haloalkyl groups, allyl groups, allyloxy groups, alkoxyalkyl groups, alkoxy-alkoxy groups, alkoxy groups, haloalkoxy groups, nitro groups and a dimethyl amino group.

2. The process as claimed in claim 1, wherein the reacting is at a temperature above 150°C.

3. The process as claimed in claim 2, including separating said styrene compound as an elution product.

4. The process as claimed in claim 1, wherein said acetophenone derivative and propiophenone derivative is chloroacetophenone, dichloroacetophenone, bromoacetophenone, methylacetophenone, methoxyacetophenone, benzyloxyacetophenone, dimethoxyacetophenone, chloromethylacetophenone, fluoroacetophenone, difluoroacetophenone, tetramethylacetophenone, trimethylacetophenone, trifluoromethylacetophenone, nitroacetophenone, dimethylaminoacetophenone, allylacetophenone, isopropylacetophenone, allylpropiophenone, methoxypropiophenone, or allyloxyacetophenone.

5. The process as claimed in claim 1, wherein said acetophenone derivative is an allyl, halogen atom or alkoxy substituted acetophenone.

6. The process as claimed in claim 1, wherein said reacting is at a pressure of 2 to 150 mmHg.

7. The process as claimed in claim 1, wherein said aluminum compound is an aluminum alkoxide.

8. The processss as claimed in claim 7, wherein said alkoxide is a secondary alkoxide.

9. The process as claimed in claim 1, wherein said acetophenone derivatives and propiophenone derivatives are represented by the general formula

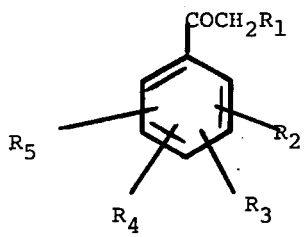

wherein $R_1$ is a hydrogen atom or a methyl group; $R_2$, $R_3$, $R_4$ and $R_5$ each is selected from the group consisting of halogen atom, an alkyl group, an allyl group, an alkoxy group, an allyloxy group, an aryloxy group, a halogen substituted alkyl group, a halogen substituted alkoxy group, a nitro group, or a dimethylamino group.

10. The process as claimed in claim 9 wherein any alkyl and alkoxy moiety has from 1 to 10 carbon atoms.

11. The process as claimed in claim 10 wherein 1 to 2 substituents are present.

12. The process as claimed in claim 7 wherein said alkoxide has at least one Al — O — R bond where R is selected from the group consisting of methyl, ethyl, propyl, isopropyl, sec-butyl, n-butyl, t-butyl, 2-pentyl, 2-octyl, 2-nonyl, methoxymethyl, phenyl, allyl, 2-keto-3-pentenyl-4-, 4-ethoxy-4oxo-3-buten-2-, and 1-keto-2-propenyl-1, 3-diphenyl-3-.

13. The process as claimed in claim 7 wherein said alkoxide has 2 to 5 carbon atoms and is a secondary alkoxide.

14. The process as claimed in claim 1 wherein the temperature is 170° to 500°C.

15. The process as claimed in claim 1 further comprising the step of isolating the product.

16. The process as claimed in claim 15 which consists of the recited steps.

17. A process for synthesizing a substantially pure styrene compound comprising reacting at least one or more acetophenone derivatives having one or more substituents in the aromatic nucleus with an aluminum compound having at least one aluminum-oxygen-carbon bond at a pressure of 0.01 to 150 mm Hg wherein said substituents are selected from the group consisting of halogen atoms, alkyl groups, aralkyl groups, aryloxy groups, haloalkyl groups, allyl groups, allyloxy groups, alkoxyalkyl groups, alkoxyalkoxy groups, alkoxy groups, haloalkoxy groups, a nitro group and a dimethyl amino group.

18. The process as claimed in claim 17 wherein the reacting is at a temperature above 150°C.

19. The process as claimed in claim 18, including separating said styrene compound as an elution product.

20. The process as claimed in claim 17 wherein said acetophenone derivative is chloroacetophenone, dichloroacetophenone, dimethoxyacetophenone, chloromethylacetophenone, fluoroacetophenone, difluoroacetophenone, tetramethylacetophenone, trimethylacetophenone, trifluoromethylacetophenone, nitroacetophenone, dimethylaminoacetophenone, allylacetophenone or isopropylacetophenone.

21. The process as claimed in claim 17 wherein said acetophenone derivative is an alkyl, halogen atom or alkoxy substituted acetophenone.

22. The process as claimed in claim 17 wherein said aluminum compound is an aluminum alkoxide.

23. The process as claimed in claim 22, wherein said alkoxide is a secondary alkoxide.

24. The process of claim 17 wherein the acetophenone derivative is represented by the general formula

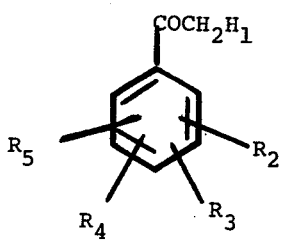

wherein $R_2$, $R_3$, $R_4$ and $R_5$ each is selected from the group consisting of halogen atom, an alkyl group, an allyl group, an alkoxy group, an allyloxy group, an aryloxy group, a halogen substituted alkyl group, a halogen substituted alkoxy group, a nitro group, or a dimethylamino group.

25. The process as claimed in claim 24 wherein any alkyl and alkoxy moiety has from 1 to 10 carbon atoms.

26. The process as claimed in claim 17 wherein said alkoxide has at least one Al — O — R bond where R is selected from the group consisting of methyl, ethyl, propyl, isopropyl, sec-butyl, n-butyl, t-butyl, 2-pentyl, 2-octyl, 2-nonyl, methoxymethyl, phenyl, allyl, 2-keto-3-pentenyl-4-, 4-ethoxy-4-oxo-3-buten-2-, and 1-keto-2-propenyl-1, 3-diphenyl-3-.

27. The process as claimed in claim 17 wherein said aluminum compound is an aluminum alkoxide in which the alkoxide group has from 1 to 9 carbon atoms, said alkoxide being a secondary alkoxide.

28. The process as claimed in claim 17 further comprising the step of isolating the product.

29. The process as claimed in claim 28 which consists of the recited steps.

30. The process as claimed in claim 17 wherein said temperature is 170° to 500°C.

* * * * *